(12) United States Patent
Wheeler et al.

(10) Patent No.: US 10,207,856 B2
(45) Date of Patent: Feb. 19, 2019

(54) LIQUID RELEASE DEVICE

(71) Applicant: Sustained Released Technologies Inc., Lady Lake, FL (US)

(72) Inventors: John Scott Wheeler, Bel Air, MD (US); George Georgiades, Lady Lake, FL (US)

(73) Assignee: Sustained Release Technologies Inc, Lady Lake, FL (US)

( * ) Notice: Subject to any disclaimer, the term of this patent is extended or adjusted under 35 U.S.C. 154(b) by 0 days.

(21) Appl. No.: 15/633,940

(22) Filed: Jun. 27, 2017

(65) Prior Publication Data
US 2018/0009596 A1 Jan. 11, 2018

Related U.S. Application Data

(60) Provisional application No. 62/360,497, filed on Jul. 11, 2016.

(51) Int. Cl.
*A01M 1/20* (2006.01)
*A45D 34/00* (2006.01)
*B65D 75/58* (2006.01)
*B65D 83/00* (2006.01)

(52) U.S. Cl.
CPC ....... B65D 83/0066 (2013.01); *A01M 1/2044* (2013.01); *A45D 34/00* (2013.01); *B65D 75/585* (2013.01)

(58) Field of Classification Search
CPC .. A45D 34/00; A45D 34/02; A45D 2034/005; B65D 83/0066; B65D 75/585; A01M 1/2044; A61L 9/12; A61L 9/127
See application file for complete search history.

(56) References Cited

U.S. PATENT DOCUMENTS

| | | | | |
|---|---|---|---|---|
| 2,383,960 | A * | 9/1945 | Dupuy | A61L 9/14 239/51.5 |
| 3,727,840 | A * | 4/1973 | Nigro | A61L 9/127 239/43 |
| 4,014,501 | A * | 3/1977 | Buckenmayer | B65D 85/00 215/332 |
| 4,161,284 | A * | 7/1979 | Rattan | A61L 9/12 239/43 |
| 4,247,042 | A * | 1/1981 | Schimanski | A01M 1/2044 239/43 |
| 4,502,630 | A * | 3/1985 | Haworth | A61L 9/12 239/34 |
| 4,630,775 | A * | 12/1986 | Mandon | A01M 1/2044 239/56 |

(Continued)

FOREIGN PATENT DOCUMENTS

FR 1231135 A * 9/1960 ............. A01N 25/26

*Primary Examiner* — Nicholas J. Weiss
(74) *Attorney, Agent, or Firm* — Sven W. Hanson

(57) ABSTRACT

A hollow container is combined with a burstable envelope retaining a liquid agent. The container is designed to allow a user to open the envelope by bursting or likewise rupturing the envelope while it remains in the container. The design of the envelope provides a predictable bursting location and a lower bursting pressure of the envelope to provide a more controlled release of liquid agent. Bursting forces may be applied in any of a variety of ways just as by twisting or crushing. The design allows for desired use of beneficial envelope materials such as polyester films that are otherwise difficult to rupture.

1 Claim, 6 Drawing Sheets

(56) References Cited

U.S. PATENT DOCUMENTS

| | | | | |
|---|---|---|---|---|
| 4,660,763 A * | 4/1987 | Gutkowski | ............... | A61L 9/12 |
| | | | | 239/121 |
| 4,995,555 A * | 2/1991 | Woodruff | .................. | A61L 9/12 |
| | | | | 239/37 |
| 7,036,800 B2 * | 5/2006 | Ellis | ..................... | A01M 1/205 |
| | | | | 261/26 |
| 7,379,662 B2 * | 5/2008 | Caserta | ............... | A01M 1/2044 |
| | | | | 239/34 |
| 9,526,809 B2 * | 12/2016 | Pizzini | .................... | A61L 9/127 |
| 9,930,880 B2 * | 4/2018 | Johnson | .............. | A01M 25/004 |

* cited by examiner

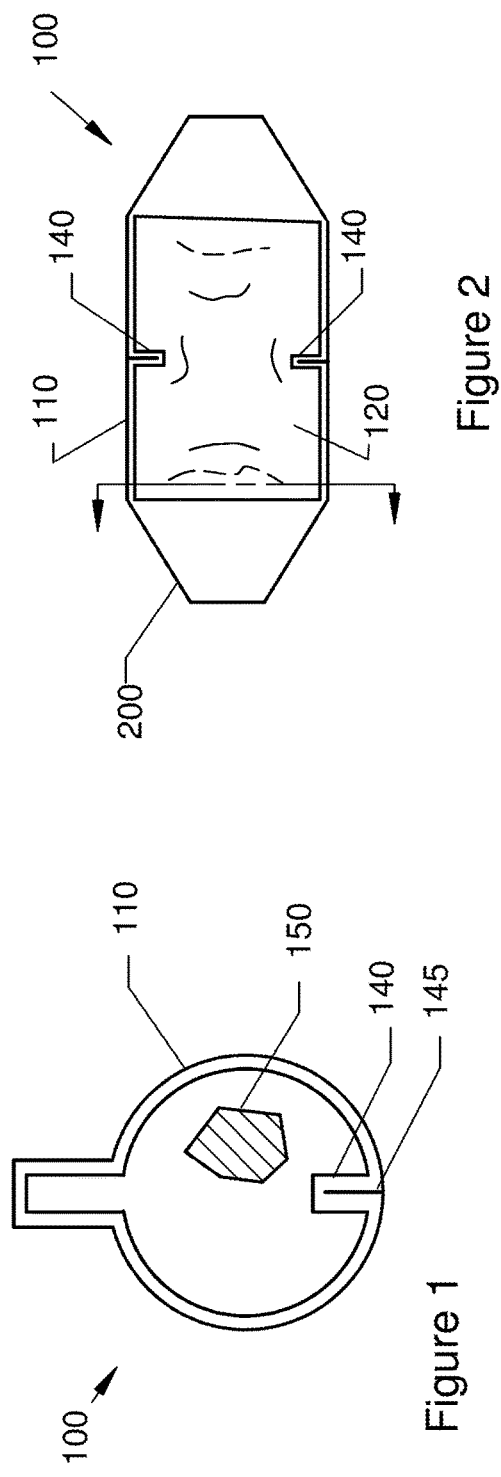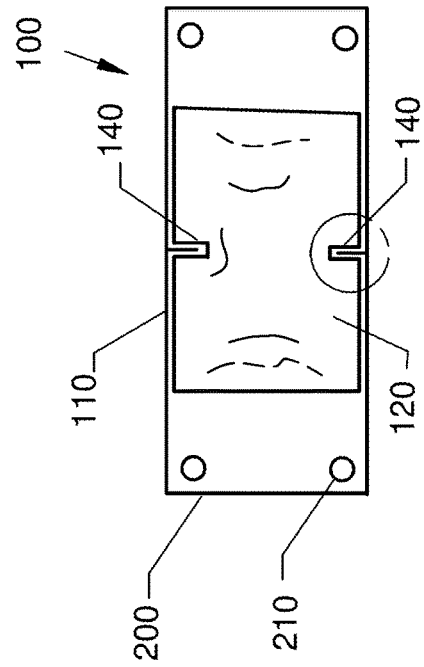

LIQUID RELEASE DEVICE

BACKGROUND

The invention pertains to devices for storing and dispensing, in a controlled manner, liquid forms of substances which are gaseous in an active form such as perfumes for odor control compounds and air-borne insect control agents.

SUMMARY OF THE INVENTION

The invention is a container combined with a burstable envelope or similar reservoir retaining a liquid agent. The container is designed to allow a user to open the envelope by bursting or likewise rupturing the envelope while it remains in the container. The envelope includes a bursting feature with a defined location. The bursting feature allows for bursting of the envelope with relatively low applied force, and reduced pressure applied to the envelope, to provide a more controlled release of a liquid agent within. The design allows for desired use of beneficial envelope materials such as polyester films that are otherwise difficult to rupture.

One embodiment of the invention includes a hollow container having a cavity generally configured to receive a liquid agent within an envelope or similar device. The container includes operable physical elements that act on a received envelope to burst or similarly open a wall of the envelope to allow the contained liquid to escape. While within the container the envelope is easily ruptured by a human user using manual manipulation and low power, without the user contacting the envelope. The container includes apertures to allow the packaged liquid to escape the container in liquid form in a controlled manner.

The invention includes a liquid-containing envelope with physical features that enable bursting or otherwise opening of the package with relatively low incidental compressive force onto the package body. Particular features of the envelope of the invention include one or more slits. The slits induce stress concentration during compression or other manipulation to cause disruption of the envelope wall at the region of the slit. This controlled bursting of the envelope enables increased control of release of liquid. Various embodiments of the invention include containers with mating portions that close together to compress a received envelope to induce bursting.

In particular embodiments of the invention, an envelope is ruptured through twisting action of mating portions of a container. Respective portions of the envelope are retained by each of two portions of the container. A user may rupture the envelope by relatively moving the portions of the container thereby twisting the envelope and inducing rupturing stresses in the envelope. In alternative embodiments of the invention, an envelope or reservoir is retained in a container with respective portions that may be manipulated by a user to crush the envelope without twisting to induce bursting. Other novel aspects of the invention are revealed in the following description of embodiments of the invention.

DESCRIPTION OF THE DRAWINGS

FIG. 1 is an illustration of a liquid containing envelope according to the invention.

FIG. 2 illustrates an alternative inventive liquid containing envelope.

FIG. 3 illustrates a further configuration of the inventive envelope.

DETAILS OF EMBODIMENTS OF THE INVENTION

Figure 5:
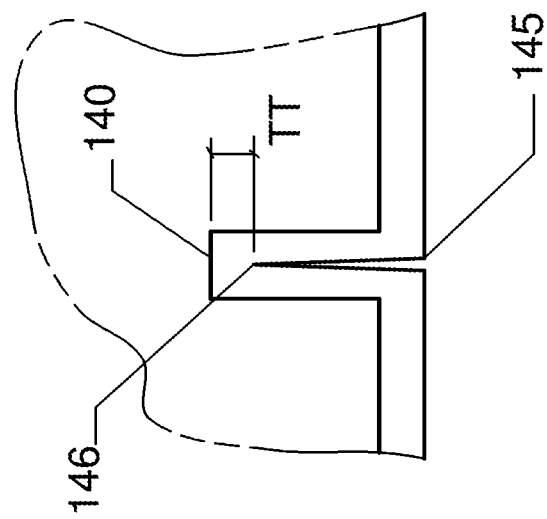
FIG. 5 is an enlarged view of a portion of the configuration of FIG. 3.
Figure 4:
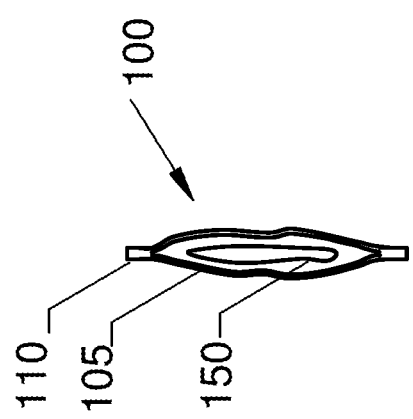
FIG. 4 illustrates a cross-section of the configuration of FIG. 2.

FIGS. 1, 2 and 3 illustrate various configurations of a reservoir or flexible envelope 100 according to the invention for containing any of a variety of liquid agents 150 such as aromatic mixtures, odor control compounds and insecticide active ingredients.

Each envelope 100 consists of two parallel and mating walls 105. The walls 105 may be formed of any of a number of thin flexible films such as polyester films such as BoPET (Biaxially-oriented polyethylene terephthalate) that may be easily self-sealed (joined together without specific adhesives) such as by heat or ultrasound methods. Each envelope 100 has a general shape that is selected for the convenience of the application and use. At the perimeter of the envelope 100 the walls are permanently joined together to form an envelope sealed portion 110 that bounds and defines a hollow cavity portion 120 that contains a volume of liquid agent 150.

Each envelope includes, formed in the sealed portion 110, an elongated peninsula or inwardly extending finger 140 of the sealed portion 110. The finger 140 is formed of substantially parallel (or very acutely angled) portions of the sealed portion. Within the finger 140 (between the parallel portions of the sealed portion 110) a slit 145 (a narrow elongated separation) extends from the perimeter edge of the envelope 100 to a slit terminal point 146. The slit 145 is open at the perimeter edge of the envelope 100. The terminal point 146 is separated from the cavity portion 120 by the sealed portion 110.

The minimum distance TT, through the sealed portion 110, from the terminal point 146 to the cavity portion 120 greatly controls the maximum force that the body of the envelope 100 can sustain before rupturing. The geometry of the finger 140 and slit 145 induce a concentration of physical stress within the material of the envelope wall 105 such that, on application of increasing gross forces to the envelope 100, the concentrated stresses at the terminal point 146 cause the envelope walls to rupture at a relatively reduced force level. The rupture occurs from the terminal point 146 through the nearby sealed portion 110 to the wall of the cavity portion 120, allowing release of the liquid agent 150.

The configuration of FIG. 1 is intended to be ruptured by application of simple compressive force on the envelope 100. The other configurations include an envelope 100 with features to enable controlled application of forces to the envelope 100. In FIG. 2, the envelope 100 includes two flat opposing tabs 200 formed of sealed walls of the envelope. Each of these may be retained in respective portions of a associated container to enable application of twisting force to the envelope 100. In FIG. 3, the envelope 100 includes two similar tabs 200, but include respective capture apertures 210. The apertures 210 enable engagement with an associated container feature to more conveniently retain the tabs 200 during use.

Figure 6:
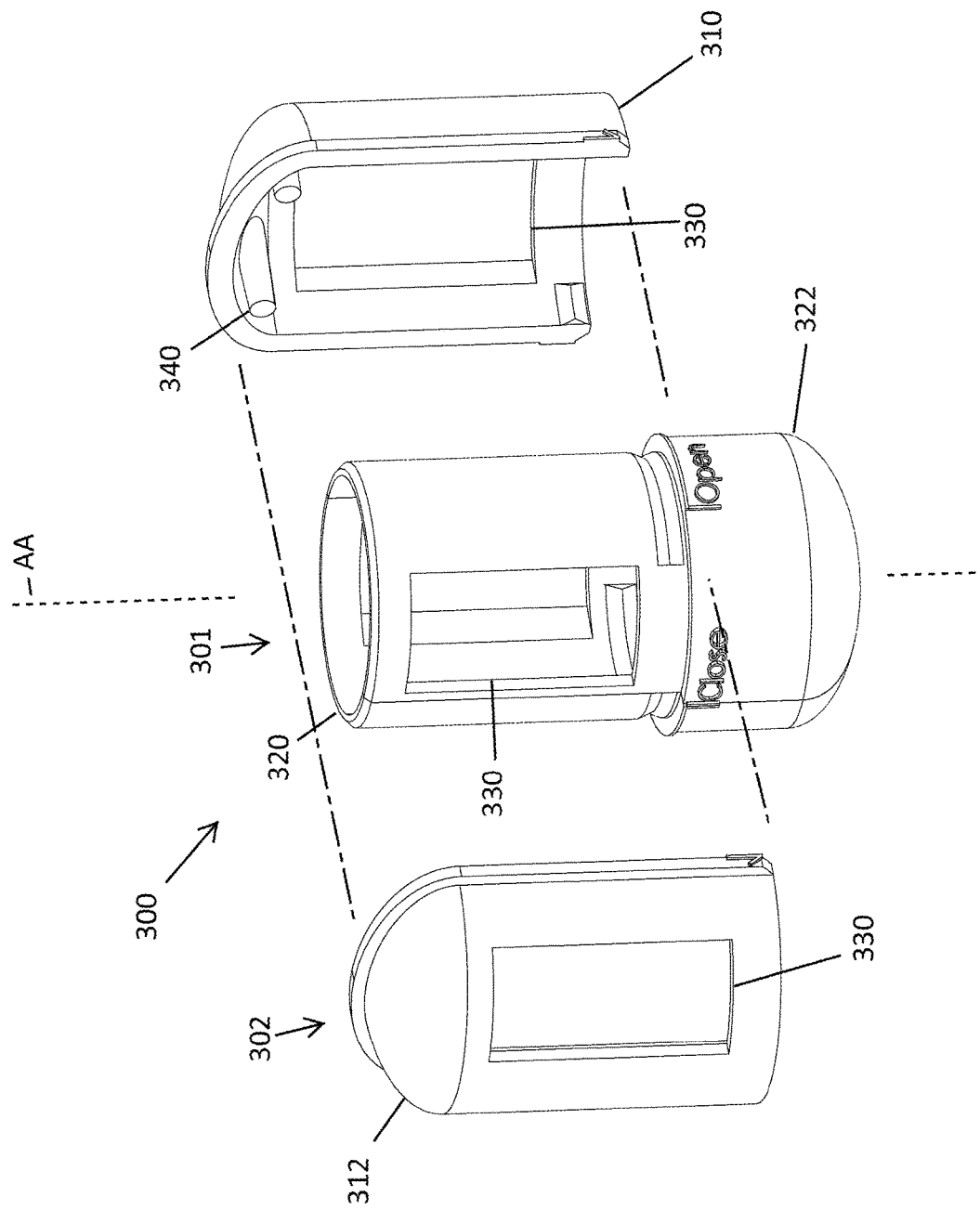
FIG. 6 is a perspective view of a preferred embodiment of a container according to the invention for receiving and retaining a liquid containing envelope.
Figure 7B:
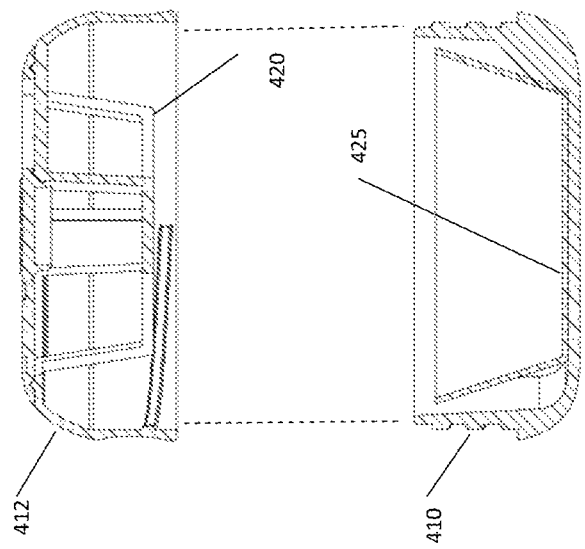
FIGS. 7A and 7B are, respectively, a side plan view and side section view of a further embodiment of the inventive container.
Figure 7A:
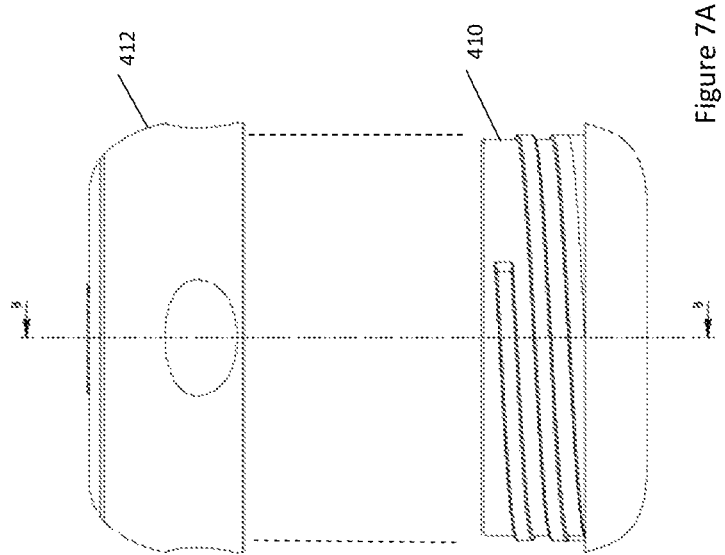

FIG. 6 illustrates one configuration of a dispensing container 300 according to the invention. The container 300 includes a first and second portion 301, 302 that define a cavity within them. In the figure, the second portion 302 is shown in exploded form for viewing purposes. The portions 301, 302 may be relatively rotated about a common center axis between a closed and an open condition. The portions 301, 302 each include wall portions and wall apertures 330 configured such that in the closed condition the portions 301, 302 form a closed container without communication between the cavity and the surrounding space. In the open condition, the respective wall apertures 330 of the two container portions align to form an open container condition wherein air may communication between the container cavity and the surrounding air.

Each container portion 301, 302 includes a method or device for grasping and retaining a respective portion of an envelope (not shown in FIG. 6) that is within the cavity. The retention method or device may, according to the invention, take any of a variety of forms. In the configuration illustrated, each portion 301, 302 includes a pair of posts 340. The posts 340 are configured to each pass through a respective envelope capture aperture 210 (FIG. 3). The posts 340 together are arranged to retain opposing envelope tabs 200 of a envelope disposed in the container 300. In this way, when the portions 301, 302 are respective rotated, the envelope 100 is deformed by twisting to induce rupture as discussed above and release of a liquid agent.

In the configuration illustrated, the second container portion 302 is preferably formed of two mating halves 310, 312 that are joined together when connecting with the first portion 301. Similarly, the first container portion 301 may be formed of halves 320, 322 that are permanently joined. All the elements of the container 300 may be constructed in other forms and using other methods.

As discussed above, after an envelope has been secured within the container 300 via the posts 340 and the portions 301, 302 joined, the envelope may be ruptured by deformation by relative rotational movement of the two portions 301, 302 about a container axis AA.

Figure 8:
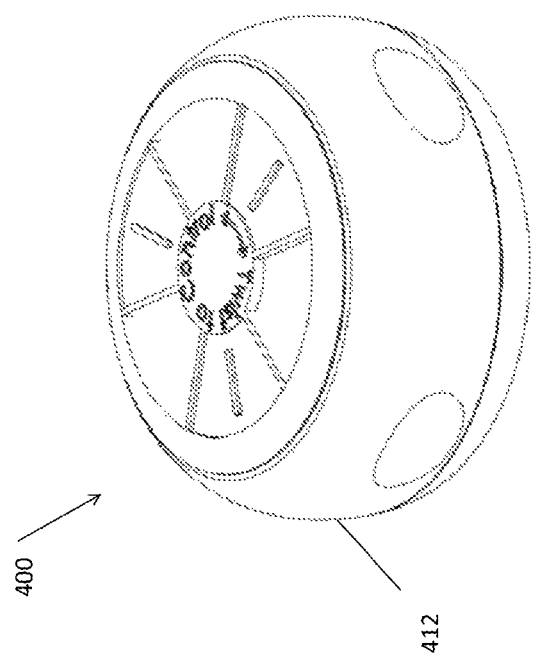
FIG. 8 is a perspective view of the embodiment of FIG. 7A.
Figure 7C:
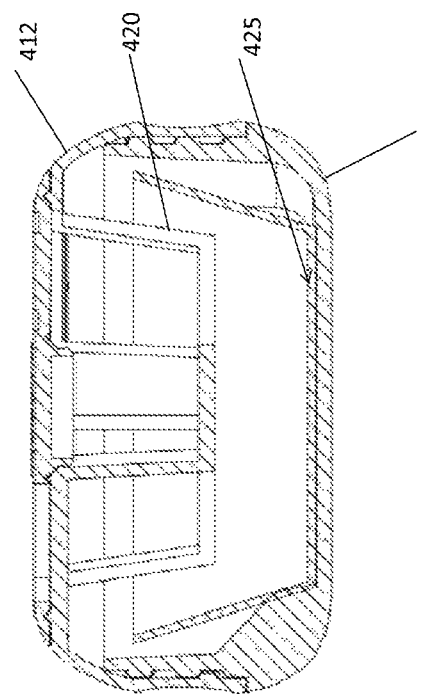
FIG. 7C is a side assembly section view of the embodiment of FIG. 7A.

FIGS. 7A, 7B, 7C, and 8 are illustrations of a common alternative embodiment of a crushing container 400 of the invention. The crushing container 400 includes two mating portions. A upper portion 412 and lower portion 410 are shown separated in FIGS. 7A and 7B. They may be joined and rigidly connected, via mating thread elements, as shown in FIG. 7C and 8. The upper portion 412 includes a crushing arm 420 that extends into the cavity formed by the two portions 410, 412. The lower portion 410 includes an inner receiving surface 425 configured to receive and retain an envelope or reservoir (FIG. 1) according to the invention. In use, after locating an envelope or reservoir on or in the receiving surface 425, the two portions 410, 412 are movement together to be joined. The action of joining the portions inherently drives the arm 420 toward the receiving surface 425, the two elements being configured to deform and crush the envelope or reservoir between them.

Figure 9:
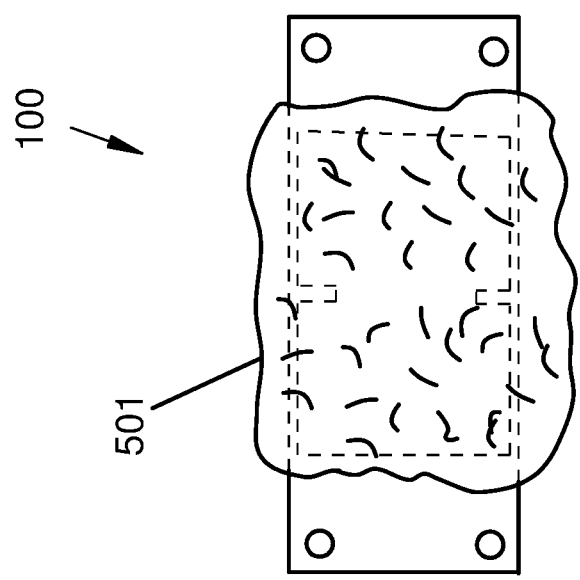
FIG. 9 is a further embodiment of the inventive envelope.

FIG. 9 depicts a preferred embodiment of an liquid-containing envelope 100 according to the invention. The envelope 100 includes a wick 501 that substantially surrounds, and is in effective contact with, the body of the envelope 100. The wick 501 is formed of any of a variety of materials that readily absorbs and retains liquids. Acceptable wick materials includes absorbent cotton, cotton wool and similar materials and materials equally absorbent and formable.

In use, the device of FIG. 9 is combined with a container as discussed respecting the device of FIG. 3. When the envelope 100 is ruptured, the liquid agent within the envelope enters the wick 501 where the liquid is allowed to evaporate and exit the container. The function of the wick 501 is to retain and control the liquid agent while allowing the liquid to exit the container and evaporate.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to elements in the singular, for example, using the articles "a," "an," "the" or "said," is not to be construed as limiting the element to the singular.

The invention claimed is:

1. A liquid release device comprising:
   a container having a first and a second mating portions defining a cavity;
   a flexible envelope and a volume of liquid agent contained in the envelope, the envelope having a weakened portion configured to be the point of bursting upon application of force to the envelope;
   at least one of the mating portions includes a receptacle retaining the envelope within the cavity;
   the mating portions moveable relatively and configured such that relative movement will deform the envelope to cause the envelope to burst at the weakened portion;
   wherein the envelope has a first and a second tab, the first tab retained by the first mating portion and the second tab retained by the second mating portion;
   the container configured to allow relative rotation of the two mating portions and wherein:
   the weakened portion comprises a slit located between the first tab and second tab.

* * * * *